United States Patent
Sharma

(10) Patent No.: US 8,229,080 B2
(45) Date of Patent: Jul. 24, 2012

(54) TESTING AND QUALITY ASSURANCE OF MULTIMODAL APPLICATIONS

(75) Inventor: Rajesh Sharma, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1433 days.

(21) Appl. No.: 11/616,435

(22) Filed: Dec. 27, 2006

(65) Prior Publication Data

US 2008/0115112 A1    May 15, 2008

Related U.S. Application Data

(63) Continuation-in-part of application No. 11/558,763, filed on Nov. 10, 2006.

(51) Int. Cl.
*H04M 1/64* (2006.01)

(52) U.S. Cl. .......... 379/88.04; 370/352; 379/10.01; 379/88.01; 379/201.01; 704/270; 704/270.1; 709/203; 709/224; 709/228

(58) Field of Classification Search .... 348/14.01–14.16; 370/259–271, 351–356; 379/1.01–35, 67.1–88.28, 379/201.01–201.05, 265.09; 455/422.1–425; 704/270–278; 709/201–207, 217–237
See application file for complete search history.

(56) References Cited

U.S. PATENT DOCUMENTS

| | | | |
|---|---|---|---|
| 5,557,539 A | 9/1996 | Fitch et al. | |
| 5,740,233 A | 4/1998 | Cave | |
| 6,477,492 B1 | 11/2002 | Connor | |
| 6,516,051 B2 * | 2/2003 | Sanders | 379/10.03 |
| 6,587,543 B1 | 7/2003 | Howard et al. | |
| 6,912,581 B2 * | 6/2005 | Johnson et al. | 709/228 |
| 6,920,425 B1 * | 7/2005 | Will et al. | 704/275 |
| 7,054,939 B2 * | 5/2006 | Koch et al. | 709/227 |
| 7,080,315 B1 * | 7/2006 | Lucas et al. | 715/201 |
| 7,117,158 B2 | 10/2006 | Weldon et al. | |
| 7,210,098 B2 * | 4/2007 | Sibal et al. | 715/205 |
| 7,224,776 B2 | 5/2007 | Creamer et al. | |
| 7,734,470 B2 * | 6/2010 | Natesan | 704/270 |
| 2002/0077819 A1 | 6/2002 | Girardo | |
| 2003/0182366 A1 * | 9/2003 | Baker et al. | 709/203 |
| 2003/0212561 A1 | 11/2003 | Williams et al. | |
| 2004/0008825 A1 * | 1/2004 | Seeley et al. | 379/32.01 |
| 2005/0047556 A1 | 3/2005 | Somerville et al. | |
| 2005/0080629 A1 * | 4/2005 | Attwater et al. | 704/275 |
| 2007/0071220 A1 | 3/2007 | Weldon et al. | |

* cited by examiner

*Primary Examiner* — Hemant Patel

(57) ABSTRACT

A system receives a condition for a multimodal application, automatically tests the multimodal application based on the received condition, and generates a test result based on the automatic testing of the multimodal application.

20 Claims, 12 Drawing Sheets

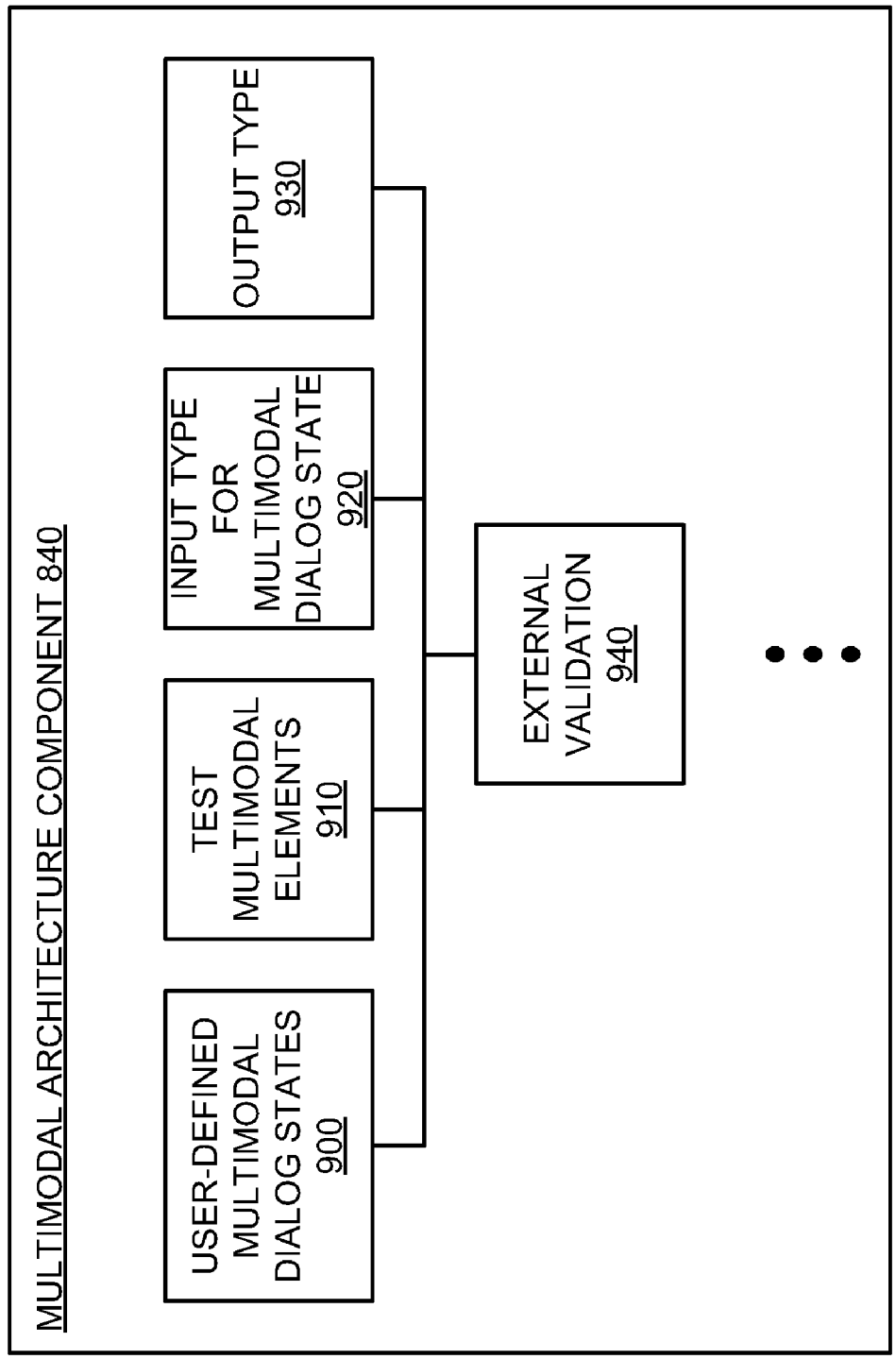

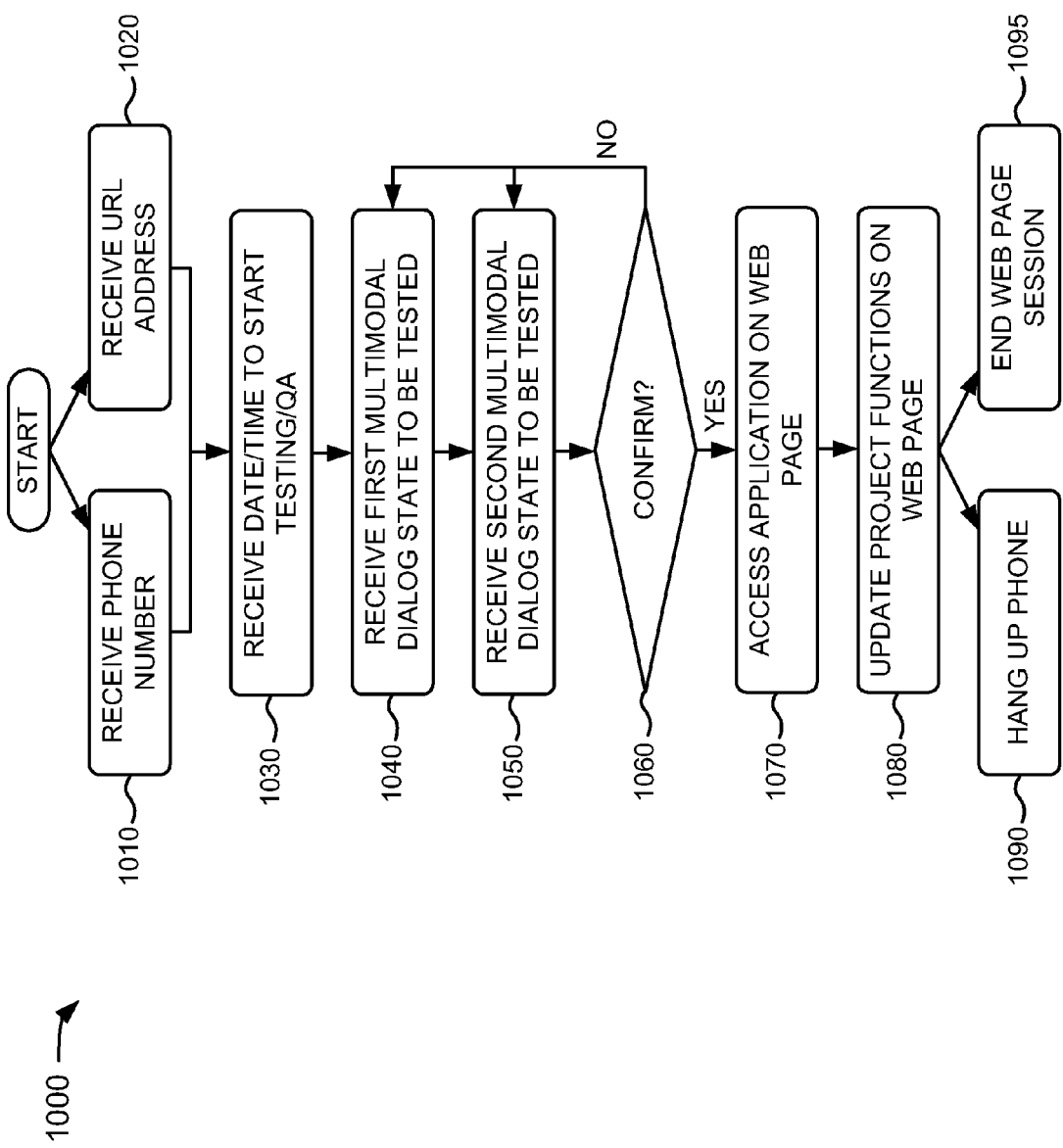

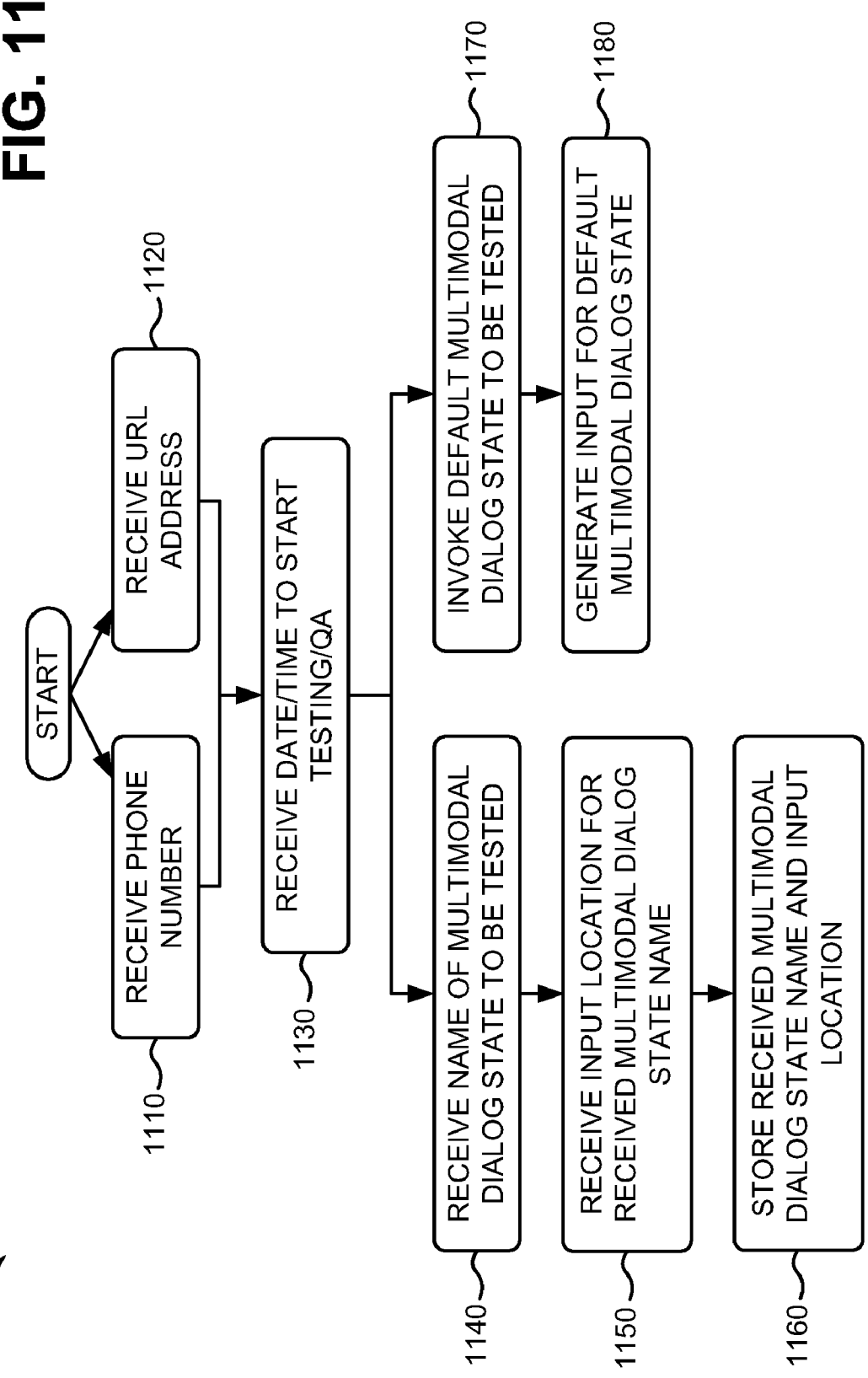

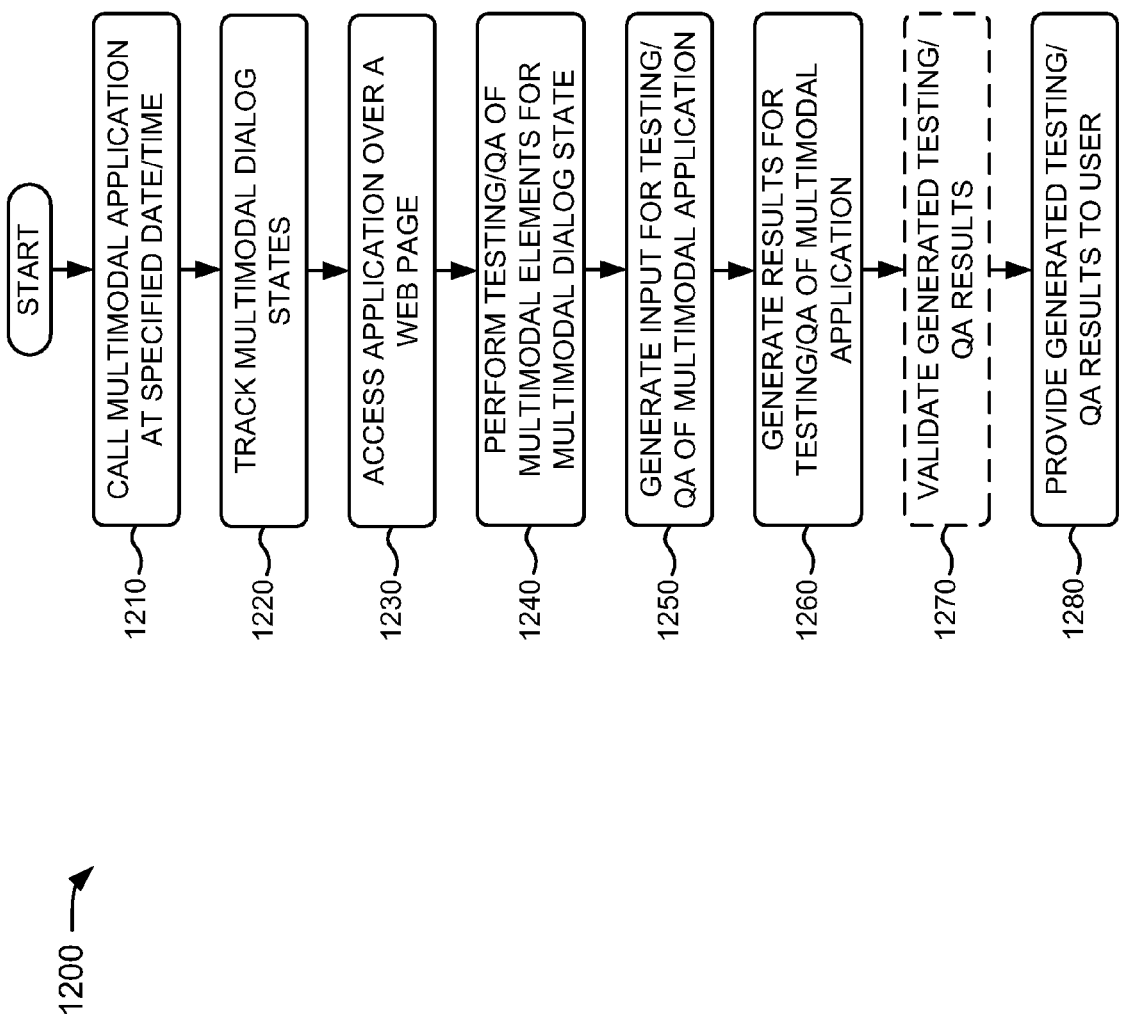

TESTING AND QUALITY ASSURANCE OF MULTIMODAL APPLICATIONS

RELATED APPLICATION

This application is a continuation-in-part (CIP) of U.S. patent application Ser. No. 11/558,763, filed Nov. 10, 2006, the disclosure of which is incorporated by reference herein in its entirety.

BACKGROUND INFORMATION

A multimodal application refers to an application that provides a user with multiple modes or devices (e.g., telephony devices, personal digital assistants (PDAs), personal computers, smart phones, etc.) from which to select an option in the form of a voice user interface (VUI), a graphical user interface (GUI), etc. A user may perform different functions depending on the device utilized by the user. For example, a user may use speech commands, a keyboard input, a tactile device (e.g., a pen or a mouse) input, etc. in order to perform such functions.

The success of a multimodal application may depend on how rigorously the application has been tested and quality assured. Typically, multimodal applications are tested by humans (e.g., quality assurance (QA) testers). The testers may follow the guidelines recommended by the World Wide Web Consortium (W3C) when testing multimodal applications. Such testers generally create a matrix of multimodal elements for each multimodal dialog state in order to test a multimodal application, and test the integrity of the multimodal application with the multimodal elements. For example, most of the multimodal dialog states may be manually tested for noinput, nomatch, and help events. These multimodal dialog states may also be manually tested for keyboard, mouse, and/or tactile inputs on a GUI, for example. However, such manual testing and quality assurance is time consuming, tedious, and expensive.

BRIEF DESCRIPTION OF THE DRAWINGS

FIG. 9 is a functional diagram of a multimodal architecture component of the testing/QA component depicted in FIG. 8;

FIGS. 10 and 11 are flowcharts of exemplary processes for receiving conditions to perform testing/QA of a multimodal application; and FIG. 12 is a flowchart of an exemplary process for automatic testing and/or QA of a multimodal application.

DETAILED DESCRIPTION

The following detailed description of the invention refers to the accompanying drawings. The same reference numbers in different drawings may identify the same or similar elements. Also, the following detailed description does not limit the invention.

Implementations described herein may provide systems and methods for automatic testing and/or quality assurance (QA) of a multimodal application. For example, in one implementation, a telephone (or phone) number to be called and/or a Uniform Resource Locator (URL) for accessing the multimodal application, and a date and/or time to start performance of testing/QA of the multimodal application may be provided (e.g., by a user) into a system for automatic testing/QA of the multimodal application. Conditions for testing/QA of the multimodal application may also be provided into the system and stored as, e.g., documents. The conditions may be provided by using a multimodal flow diagram, and/or by providing the name of each multimodal dialog state. Multimodal elements to be tested for each dialog state of the multimodal application may be pre-defined and provided into the system. The system may call the provided phone number and/or invoke the URL, and may automatically perform testing/QA (e.g., may automatically test the multimodal dialog states for events, hang-ups, routine maintenance, etc.). The system may generate a log of any issues encountered during testing/QA of the multimodal application, and may notify (e.g., the user) of the testing/QA results of the multimodal application. Automatic testing/QA of multimodal applications may help reduce the time and cost required to perform testing/QA of multimodal applications.

A "document," as the term is used herein, is to be broadly interpreted to include any machine-readable and machine-storable work product. A document may include, for example, a file, a combination of files, one or more files with embedded links to other files, etc. In the context of the Internet, a common document is a web page. Web pages often include textual information and may include embedded information (such as meta information, images, hyperlinks, etc.) and/or embedded instructions (such as Javascript, etc.).

Figure 1:
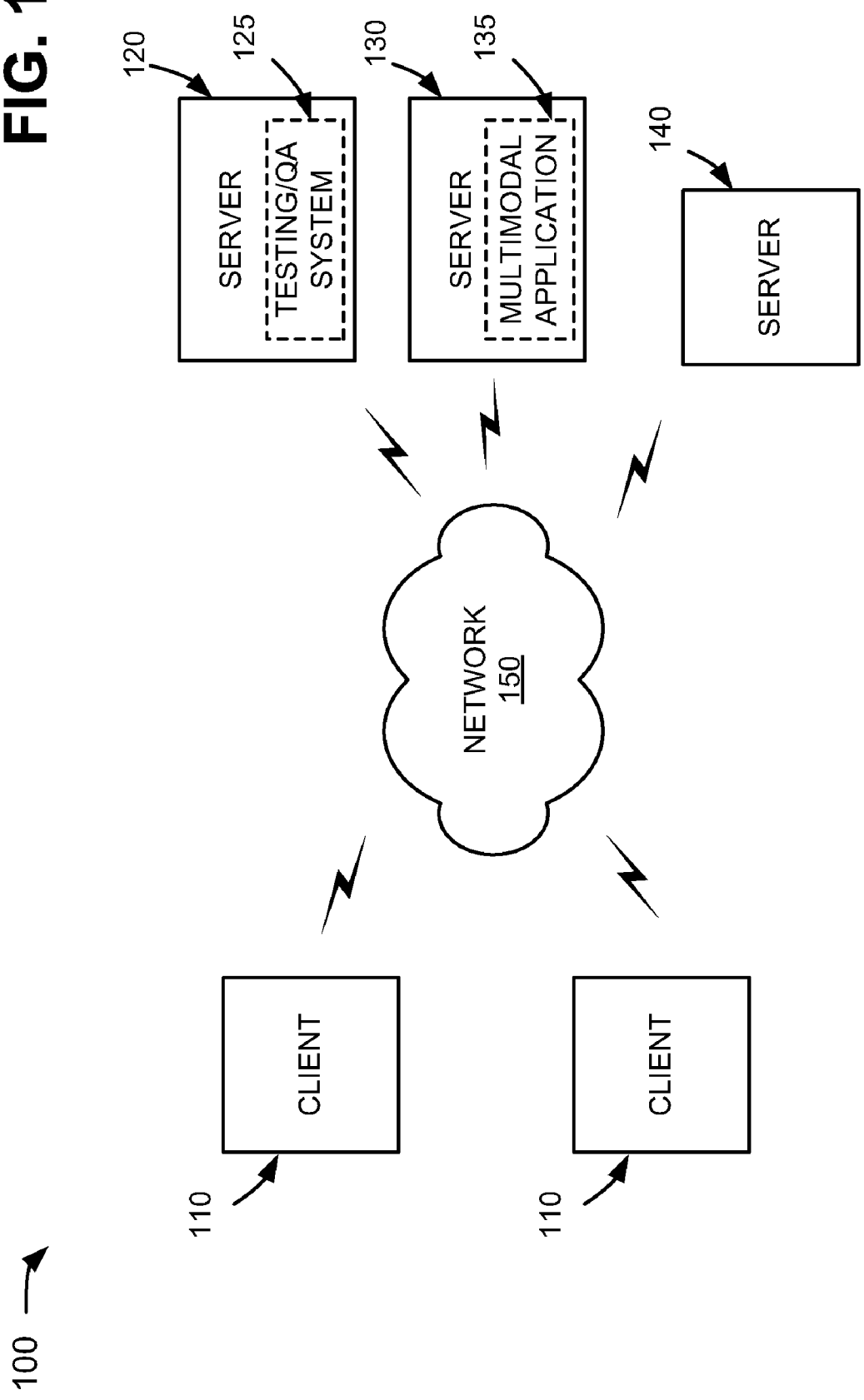
FIG. 1 depicts an exemplary network in which systems and methods described herein may be implemented.

FIG. 1 depicts an exemplary network 100 in which systems and methods described herein may be implemented. As shown, network 100 may include multiple clients 110 connected to multiple servers 120-140 via a network 150. Two clients 110 and three servers 120-140 have been illustrated as connected to network 150 for simplicity. In practice, there may be more or fewer clients and servers. Also, in some instances, a client may perform one or more functions of a server and/or a server may perform one or more functions of a client.

Clients 110 may include client entities. An entity may be defined as a device, such as a personal computer, a wireless telephone, a personal digital assistant (PDA), a laptop, or another type of computation or communication device, a thread or process running on one of these devices, and/or an object executable by one of these devices. Servers 120-140 may include server entities that gather, process, search, and/or maintain documents.

Server 120 may include a system 125 for automatic testing and/or QA of a multimodal application 135. Multimodal application 135 may be provided, for example, within server 130. In another implementation, server 120 may include testing/QA system 125 and multimodal application 135. In still another implementation, client 110 may include testing/QA system 125. In still a further implementation, testing/QA system 125 may be provided on server 120 and may be useable by clients 110. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Network 150 may include, for example, a local area network (LAN), a wide area network (WAN), a telephone network, such as the Public Switched Telephone Network (PSTN), an intranet, the Internet, or a combination of networks. Clients 110 and servers 120-140 may connect to network 150 via wired, wireless, and/or optical connections.

Although FIG. 1 shows exemplary components of network 100, in other implementations, network 100 may contain fewer or additional components that may provide testing/QA of multimodal applications. In still other implementations, one or more components of network 100 may perform the tasks performed by other components of network 100.

Figure 2:
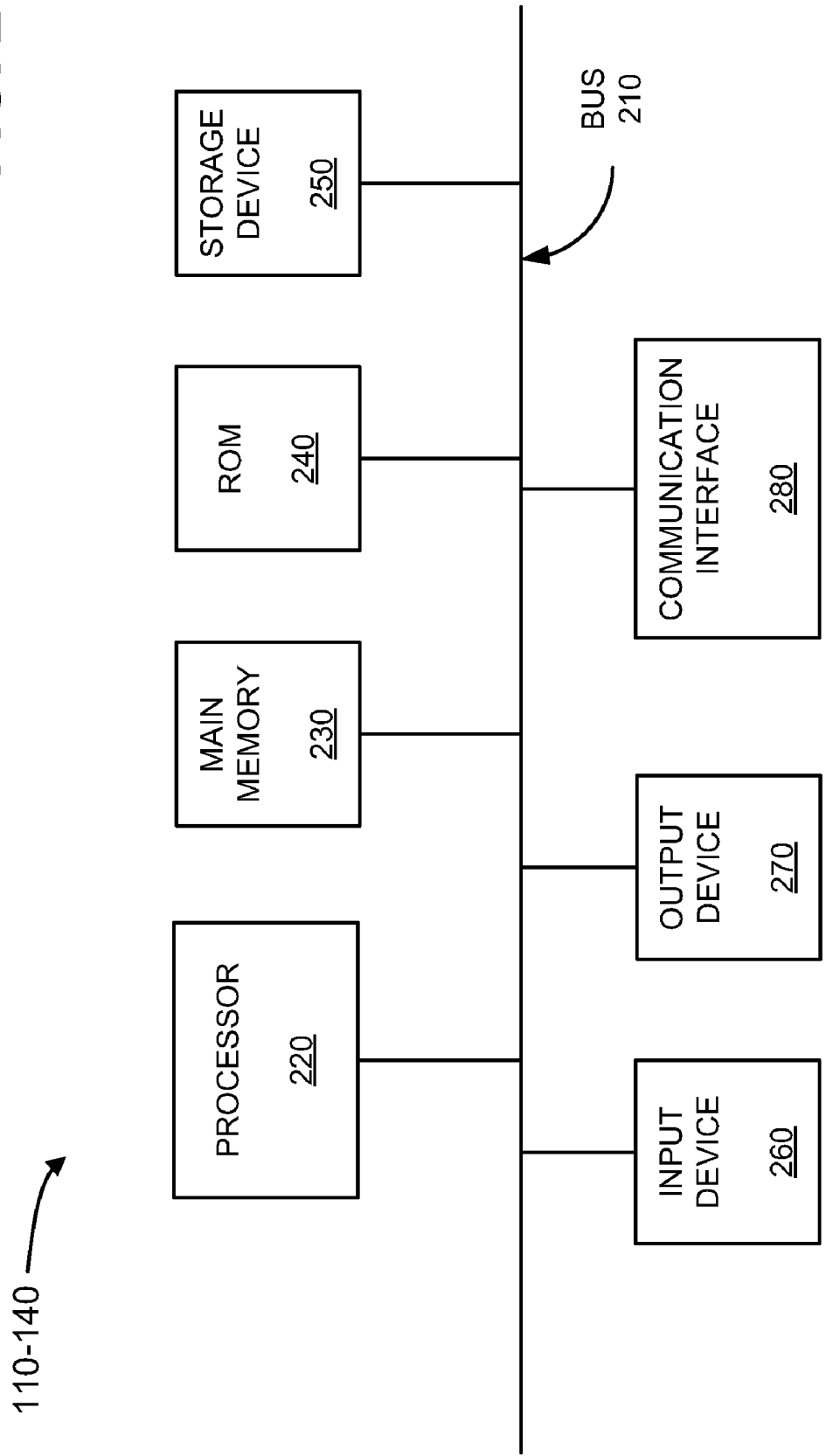
FIG. 2 depicts an exemplary device, client or server, configured to communicated via the exemplary network of FIG. 1.

FIG. 2 is an exemplary diagram of a client or a server entity (hereinafter called "client/server entity"), which may correspond to one or more of clients 100 or servers 120-140. The client/server entity may include a personal computer, a wireless telephone, a PDA, a laptop, or another type of computation or communication device, a thread or process running on one of these devices, and/or an object executable by one of these devices. The client/server entity may include a bus 210, a processor 220, a main memory 230, a read only memory (ROM) 240, a storage device 250, an input device 260, an output device 270, and a communication interface 280. Other configurations are also possible.

Bus 210 may include a path that permits communication among the elements of the client/server entity. Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network.

As will be described in detail below, the client/server entity may perform certain operations to test and/or provide quality assurance of a multimodal application (e.g., multimodal application 135). The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer or additional components than depicted in FIG. 2. In still other implementations, one or more components of the client/server entity may perform the tasks performed by other components of the client/server entity.

Figure 3:
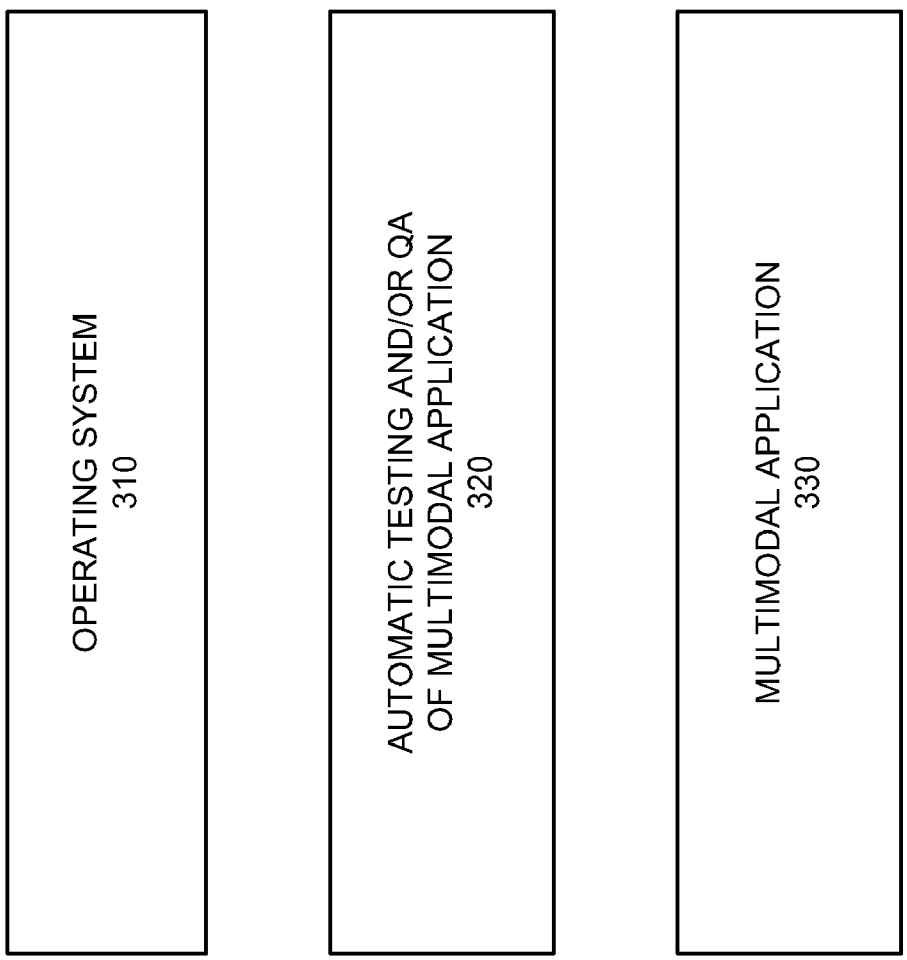
FIG. 3 is a diagram of a portion of an exemplary computer-readable medium that may be used by the device of FIG. 2.

FIG. 3 is a diagram of a portion of an exemplary computer-readable medium 300 that may be used by a device, such as the client/server entity of FIG. 2. In one implementation, computer-readable medium 300 may correspond to memory 230 of the client/server entity. The portion of computer-readable medium 300 illustrated in FIG. 3 may include an operating system 310, automatic testing and/or QA of a multimodal application software 320, and multimodal application software 330. Automatic testing/QA software 320 and/or multimodal application software 330 may be included in operating system 310 or may be separate from operating system 310. Automatic testing/QA software 320 may be included in multimodal application software 330 or may be separate from multimodal application software 330.

Operating system 310 may include operating system software, such as the Microsoft Windows, Apple MAC OS, Linux, Unix, IBM OS/2, and/or operating systems for personal computers, PDAs, laptops, or other types of computation or communication devices.

Automatic testing/QA software 320 may include an executable object or process. The client/server entity of FIG. 2 may obtain the executable object or process from a server or from a disk, tape, network, CD-ROM, etc. Alternatively, the executable object or process may be pre-installed on the client/server entity.

Automatic testing/QA software 320 may permit automatic testing and/or performance of QA on a multimodal application. Automatic testing/QA software 320 may be automatically activated upon initiation of operating system 310. Alternatively, automatic testing/QA software 320 may be activated when instructed by a user. In either case, automatic testing/QA software 320 may permit testing and/or QA on a multimodal application, as will be described below.

Multimodal application software 330 may include an executable object or process. The client/server entity of FIG. 2 may obtain the executable object or process from a server or from a disk, tape, network, CD-ROM, etc. Alternatively, the executable object or process may be pre-installed on the client/server entity.

Multimodal application software 330 may include software that permits a user to use multiple devices (e.g., telephony devices, PDAs, personal computers, smart phones etc.) in order to select an option in the form of a VUI, a GUI, etc. Multimodal application software 330 may play pre-recorded voice prompts to which the user may respond by either pressing a number on a telephone keypad, by speaking, by using a GUI, by using a keyboard, by using a mouse, by using other tactile events, etc. Multimodal application software 330 may operate in conjunction with automatic testing/QA software 320, and may enable testing/QA of multimodal application software 330 by automatic testing/QA software 320. In another implementation, multimodal application software 330 may be a process separate from operating system 310 and/or automatic testing/QA software 320. In this latter implementation, multimodal application software 330 (e.g., multimodal application 135) may be provided on a device (e.g., server 130) separate from a device that includes automatic testing/QA software 320, but may interact with automatic testing/QA software 320, e.g., via network 150.

Multimodal application software 330 may be automatically activated upon initiation of automatic testing/QA software 320. Alternatively, multimodal application software 330 may be activated when instructed by a user. In either case, multimodal application software 330 may permit testing and/or performance of QA by automatic testing/QA software 320, as will be described below.

Figure 4:
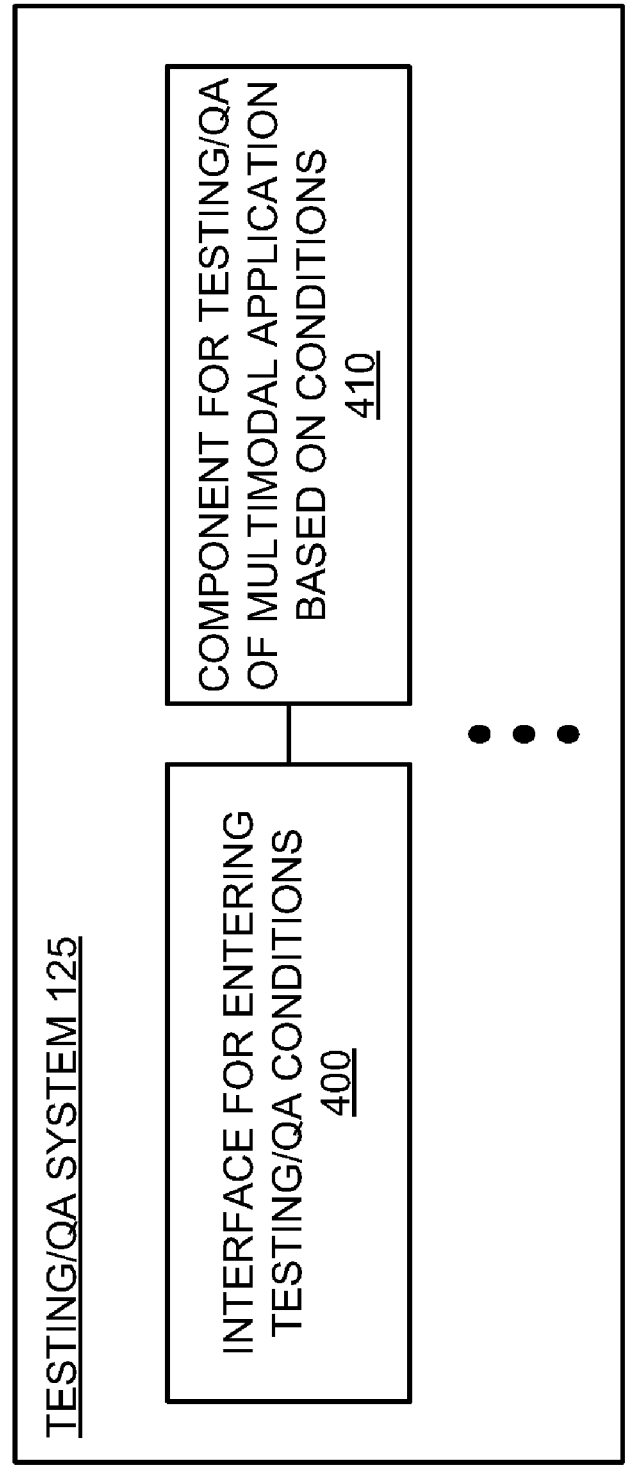
FIG. 4 is a functional diagram of an exemplary system for automatic testing and/or quality assurance (QA) of a multimodal application.

FIG. 4 is a functional diagram of testing/QA system 125. According to one implementation, one or more of the functions of testing/QA system 125, as described below, may be performed by a device (e.g., the client/server entity of FIG. 2). According to another implementation, one or more of the functions of testing/QA system 125 may be performed by an entity separate from the client/server entity, such as a computer associated with the client/server entity.

As shown in FIG. 4, testing/QA system 125 may include an interface 400 for providing testing/QA conditions for a multimodal application, and a component 410 for performing testing/QA of the multimodal application based on the testing/QA conditions provided with interface 400. In one example, interface 400 may be a graphical user interface (GUI) that may allow a user to provide conditions for testing and/or QA of a multimodal application. In another example, interface 400 may allow a user to provide conditions for testing and/or QA of a multimodal application via speech. In still another example, interface 400 may allow a user to provide conditions for testing and/or QA of a multimodal application via command line instructions.

Interface 400 may be accessed in a variety of ways. For example, interface 400 may be accessed remotely using a web browser (e.g., Internet Explorer, Netscape, Firefox, etc.) provided on, e.g., client 110. In another example, interface 400 may be accessed remotely, e.g., on handheld devices such as cell phones, PDAs, etc. In still another example, interface 400 may be accessed using a telephone. In a further example, interface 400 may be accessed as a stand alone application on a device (e.g., the client/server entity of FIG. 2).

Testing/QA component 410 may include a variety of components that perform testing/QA of a multimodal application. Testing/QA component 410 is further described below in connection with FIGS. 8 and 9.

Although FIG. 4 shows exemplary components of testing/QA system 125, in other implementations, testing/QA system 125 may include fewer or additional components than depicted in FIG. 4. In still other implementations, one or more components of testing/QA system 125 may perform the tasks performed by other components of testing/QA system 125.

Figure 5:
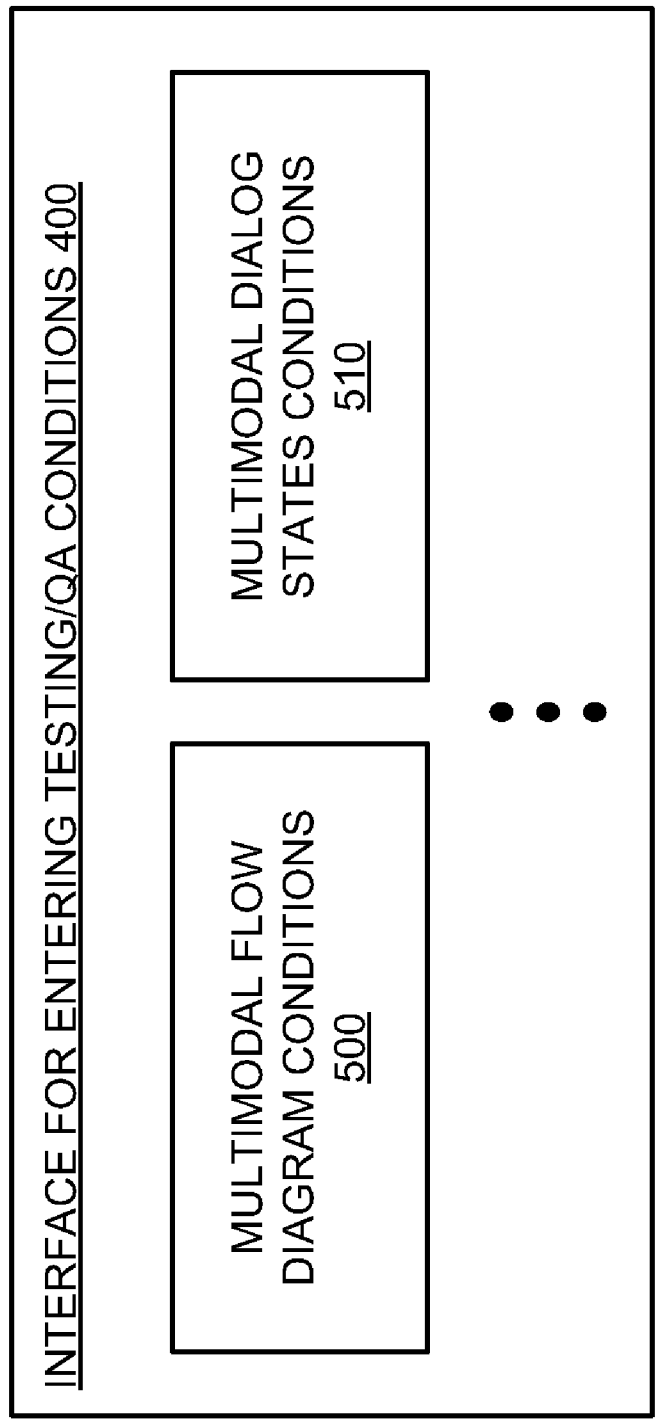
FIG. 5 is a functional diagram of an interface for providing testing/QA conditions of the system depicted in FIG. 4.

FIG. 5 is a functional diagram of interface 400 for providing testing/QA conditions of testing/QA system 125. As shown, a user may provide a variety of testing/QA conditions, e.g., multimodal flow diagram conditions 500 and/or multimodal dialog states conditions 510. Multimodal flow diagram conditions 500 may include a multimodal flow diagram that describes the multimodal dialog states to be reviewed during the testing/QA of a multimodal application. Multimodal dialog states conditions 510 may include the name of each multimodal dialog state to be reviewed during the testing/QA of a multimodal application. Multimodal dialog states conditions 510 may also include multimodal elements to be tested for each multimodal dialog state.

Although FIG. 5 shows exemplary types of conditions that may be provided via interface 400, in other implementations, fewer or more conditions than depicted in FIG. 5 may be provided via interface 400. Furthermore, although FIG. 5 shows multimodal flow diagram conditions 500 and multimodal dialog states conditions 510 as being separate, in other implementations, any combination of multimodal diagram flow conditions 500 and multimodal dialog states conditions 510 may be provided via interface 400.

Figure 6:
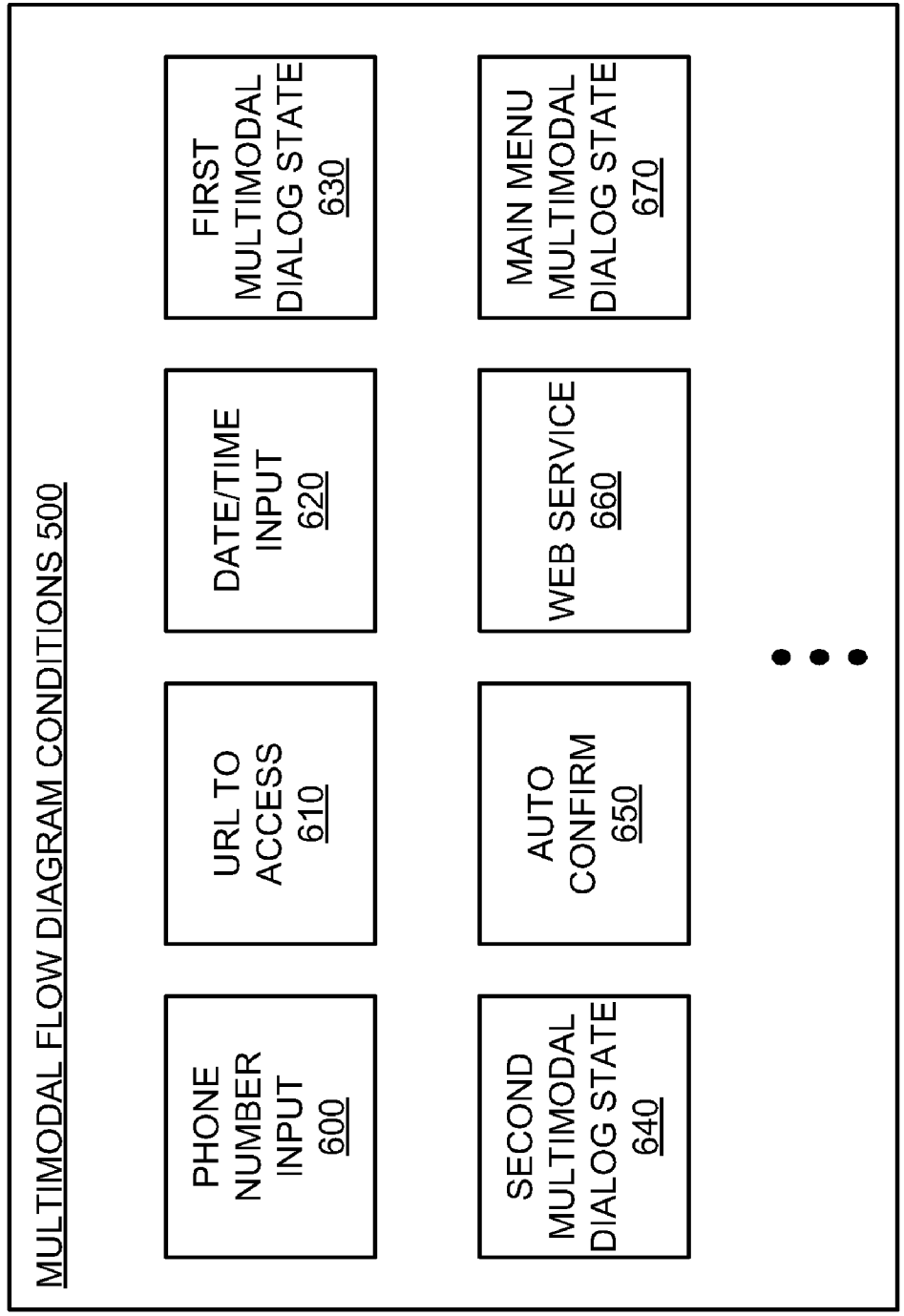
FIG. 6 is a diagram of exemplary multimodal flow diagram conditions capable of being provided by the interface of FIG. 5.

FIG. 6 is a diagram of exemplary multimodal flow diagram conditions 500 that may be provided via interface 400. As shown, a variety of multimodal flow diagram conditions 500 may be provided, e.g., a phone number input 600, a Uniform Resource Locator (URL) to access 610, a date/time input 620, a first multimodal dialog state 630, a second multimodal dialog state 640, an auto confirm 650, a web service 660, a main menu multimodal dialog state 670, etc.

Phone number input 600 may include the telephone number to call for testing and/or QA a speech portion of a multimodal application. In other words, the telephone number may provide access to the speech portion of the multimodal application. For example, a user may provide phone number input 600, and testing/QA component 410 may call the telephone number provided by phone number input 600 in order to access the speech portion of the multimodal application, and may perform testing/QA thereon.

URL to access 610 may include a URL to access for testing/QA the multimodal application. URL to access 610 may access a GUI portion of the multimodal application. For example, functions (e.g., updating a name of a user) of the multimodal application can be performed using speech and/or a GUI on web page, PDA, smart phone etc., where the GUI may be accessed via URL to access 610.

Date/time input 620 may include a date and/or a time indicating when to start testing and/or QA of the multimodal application. For example, a user may provide date/time input 620, and testing/QA component 410 may perform testing/QA of the multimodal application at the date and/or time specified by date/time input 620.

First multimodal dialog state 630 may include a first multimodal dialog state of the multimodal application for testing/QA. For example, a user may provide first multimodal dialog state 620 of the multimodal application (e.g., "GetUserID" may be a first multimodal dialog state where the user wants an automatic speech input, a telephone keypad input, a keyboard input, and/or a mouse input in the form of digits for a "User Identification Number"), and testing/QA component 410 may input digits in the form of speech, telephone keypad input, keyboard input, and/or mouse input if first multimodal dialog state 630 of the multimodal application is accessed.

Second multimodal dialog state 640 may include a second multimodal dialog state of the multimodal application for testing/QA. For example, a user may provide second multimodal dialog state 640 of the multimodal application (e.g., "MyProjects" may be a second multimodal dialog state where the user wants an automatic speech input of "MyProjects", and/or keyboard input of "MyProjects" on a GUI), and testing/QA component 410 may speech input a "MyProjects" and/or keyboard input "MyProjects" if second multimodal dialog state 640 of the multimodal application is accessed.

Auto confirm 650 may include a mechanism to automatically confirm whether speech input and/or keyboard input in second multimodal dialog state 640 (e.g., provided by testing/QA component 410) is correct. If auto confirm 650 determines that the speech input and/or keyboard input are incorrect, testing/QA component 410 may return to second multimodal dialog state 640 and may request correct re-input of the speech input ("MyProjects") and/or keyboard input ("MyProjects"). Otherwise, testing/QA component 410 may invoke web service 660.

Web service 660 may include a mechanism to invoke a web service, if requested by the user, for validation. For example, testing/QA component 410 may invoke web service 660 to gather a list of projects assigned to a user identification (ID) number entered in first multimodal dialog state 630.

Main menu multimodal dialog state 670 may include a main menu multimodal dialog state of the multimodal application. For example, main menu multimodal dialog state 670 may request user identification information (e.g., account information, user name, a personal identification number (PIN), etc.).

Although FIG. 6 shows exemplary multimodal flow diagram conditions 500 that may be provided via interface 400, in other implementations, fewer or more multimodal flow diagram conditions than depicted in FIG. 6 may be provided via interface 400. For example, although two multimodal dialog states (e.g., first multimodal dialog state 630 and second multimodal dialog state 640) are shown in FIG. 6, in other implementations, any number of multimodal dialog states may be received via interface 400.

Figure 7:
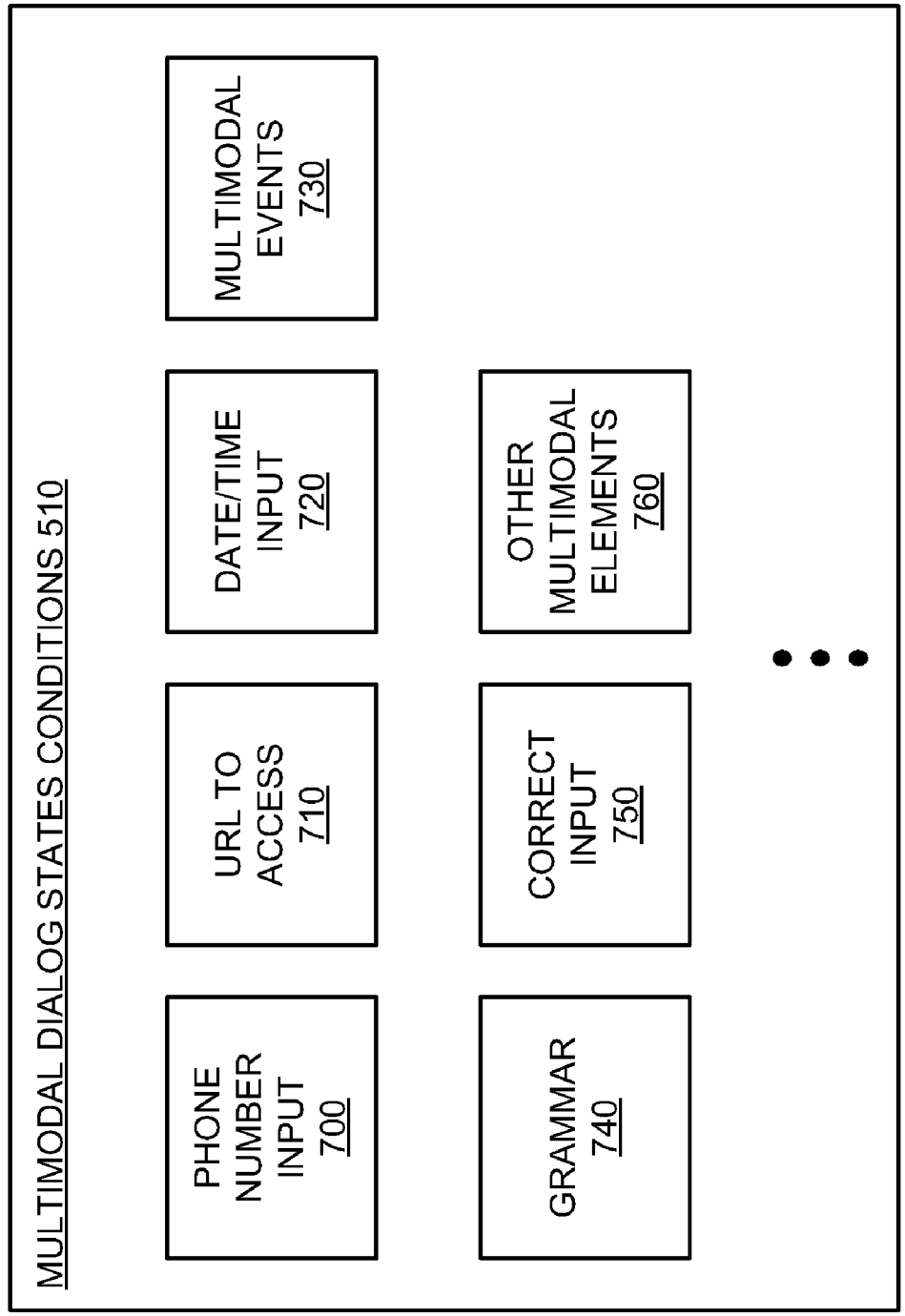
FIG. 7 is a diagram of exemplary multimodal dialog states conditions capable of being provided by the interface of FIG. 5.

FIG. 7 is a diagram of exemplary multimodal dialog states conditions 510 that may be provided via interface 400. As shown, a variety of multimodal dialog states conditions 510 may be provided, e.g., a phone number input 700, a URL to access 710, a date/time input 720, multimodal events 730, grammar 740, correct input 750, other multimodal elements 760, etc.

Phone number input 700 may include the telephone number to call for testing and/or QA of a multimodal application. In other words, the telephone number may provide access to a speech portion of the multimodal application. For example, a user may provide phone number input 700, and testing/QA component 410 may call the telephone number provided by phone number input 700 in order to access the speech portion of the multimodal application, and may perform testing/QA thereon.

URL to access 710 may include a URL to access for testing/QA the multimodal application. URL to access 710 may access a GUI portion of the multimodal application. For example, functions (e.g., updating a name of a user) of the multimodal application may be performed using speech and/or a GUI on a web page, PDA, smart phone, etc., where the GUI may be accessed via URL to access 710.

Date/time input 720 may include a date and/or a time indicating when to start testing and/or QA of the multimodal application. For example, a user may provide date/time input 720, and testing/QA component 410 may perform testing/QA (e.g., by calling the multimodal application 700 and/or accessing the multimodal application using URL to access 710) of the multimodal application at the date and/or time specified by date/time input 720.

The user may have the option of inputting a name of a multimodal dialog state from where testing/QA component 410 may begin testing/QA of the multimodal application. For example, the user may provide the name of multimodal events 730, grammar 740, correct input 750, other multimodal elements 760, etc. If no name for a multimodal dialog state is provided by a user, testing/QA component 410 may start from a default first multimodal dialog state reached by calling the telephone number provided by phone number input 700 and/or by accessing the GUI portion of the multimodal application via URL to access 710.

Multimodal events 730 may include the names of multimodal events (e.g., noinput, nomatch, help, etc.) for testing/QA by component 410. For example, a user may provide the names of multimodal events 730, via interface 400, and testing/QA component 410 may perform testing/QA on multimodal events 730. The user may also specify, via interface 400, the location of speech input (e.g., the names of audio files to be used for a nomatch events, noinput events, etc.) for multimodal events 730. Testing/QA component 410 may perform testing/QA on multimodal events 730 using the user-defined inputs for multimodal events 730. If the user does not specify the names of multimodal events 730 to be tested for a multimodal dialog state, testing/QA component 410 may perform testing/QA for default multimodal events (e.g., noinput, nomatch, etc.), and may provide synthetic speech as the input for the default multimodal events.

Grammar 740 may include user-defined (e.g., via interface 400) grammar to be used for a speech portion of a multimodal dialog state. For example, grammar 740 may include customized grammar (e.g., the grammar used to define a type of flower may be customized to include a rose, a tulip, etc.). In another example, the user may specify, via interface 400, the location of an input (e.g., where a recorded input is stored) for grammar 740. Testing/QA component 410 may perform testing/QA using the user-defined inputs for grammar 740. If no customized grammar is specified, testing/QA component 410 may perform testing/QA for default grammar (e.g., as specified in the speech portion of the multimodal dialog state), and may provide synthetic speech as the input for the default grammar.

Correct input 750 may include user-defined (e.g., via interface 400) correct input for a multimodal dialog state. For example, correct input 750 may include a correct input for multimodal events 730, grammar 740, other multimodal elements 760, etc. Testing/QA component 410 may perform testing/QA for correct input 750 using the user-defined correct inputs for multimodal dialog states. If no correct input 750 is defined, testing/QA component 410 may perform testing/QA for a default correct input. In one example, correct input 750 may include a speech input, a keyboard input, a mouse input a tactile input (e.g., pen or stylus), etc.

Other multimodal elements 760 may include any of the multimodal elements used in a multimodal application. For example, the user may specify other types of inputs of a multimodal application as other multimodal elements 760, and testing/QA component 410 may perform testing/QA on other multimodal elements 760.

Although FIG. 7 shows exemplary multimodal dialog states conditions 510 that may be provided via interface 400, in other implementations, fewer or more multimodal dialog states conditions than depicted in FIG. 7 may be provided via interface 400.

Figure 8:
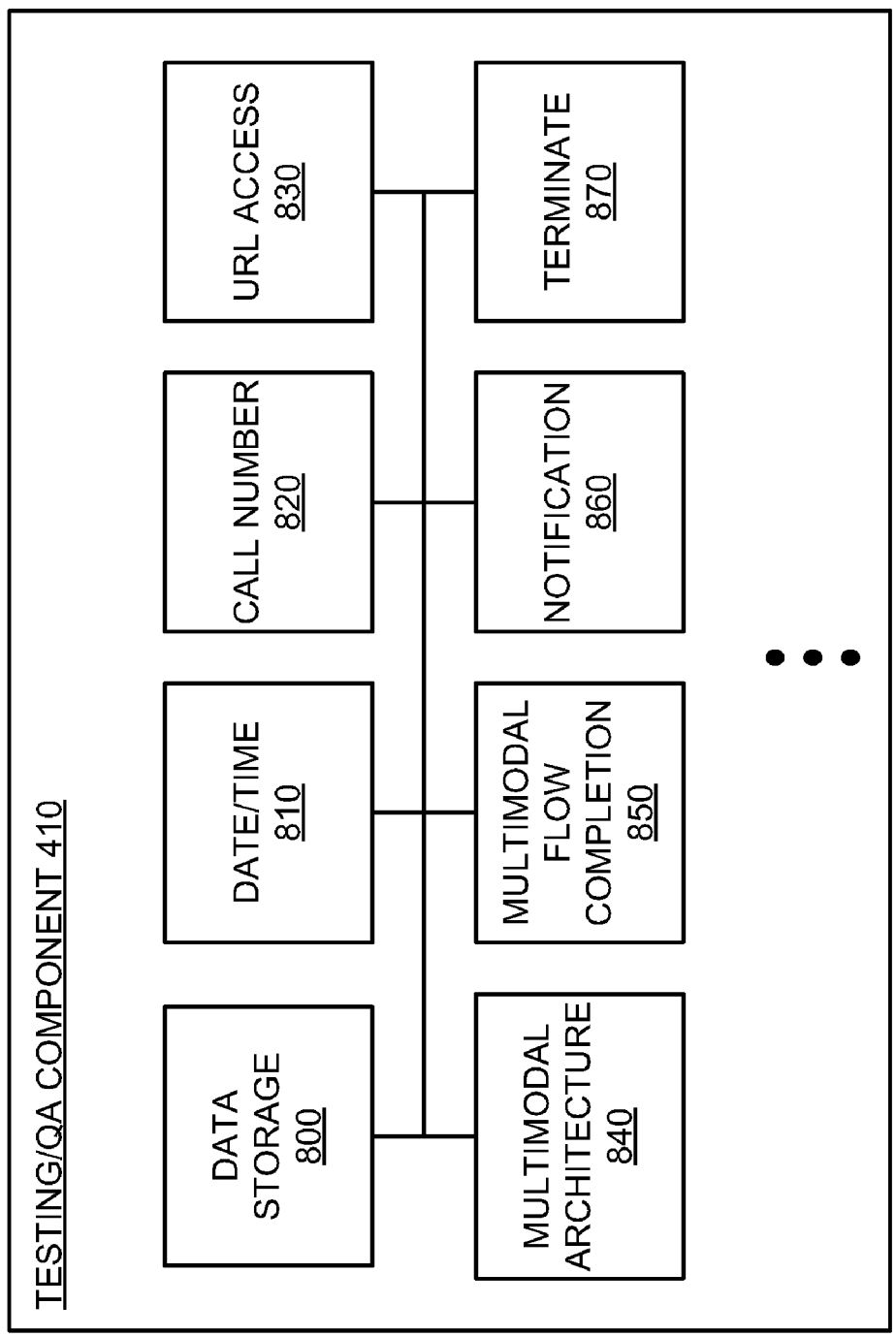
FIG. 8 is a functional diagram of a component for performing testing/QA of a multimodal application of the system depicted in FIG. 4.

FIG. 8 is a functional diagram of testing/QA component 410 of testing/QA system 125. As shown, component 410 may include a variety of components, e.g., a data storage component 800, a date/time component 810, a call number component 820, a URL access component 830, a multimodal architecture component 840, a multimodal flow completion component 850, a notification component 860, a terminate component 870, etc.

Data storage component 800 may include any type of memory device (e.g., main memory 230, read only memory (ROM) 240, and/or storage device 250 of the client/server entity of FIG. 2). Data storage component 800 may provide storage for the testing/QA conditions provided by a user via interface 400, as described above in connection with FIGS. 4-7. The testing/QA conditions may be stored in a variety of ways. For example, the testing/QA conditions may be stored as files (e.g., a Microsoft Word document, a Microsoft Excel document, a Comma Separate file, etc.), and/or as a database management types (e.g., relational, object oriented, network, hierarchical, file system-based, etc.).

Date/time component 810 may retrieve the date and time provided by a user (e.g., date/time inputs 620 and 720) from data storage component 800. Date/time component 810 may begin performance of testing/QA of a multimodal application at the provided date and time.

If testing/QA component 410 begins testing/QA of the multimodal application as specified by date/time component 810, call number component 820 may retrieve the telephone number to be called for the multimodal application (e.g., phone number input 600 or 700) from data storage component 800. Call number component 820 may also initiate the telephone call to the multimodal application using the retrieved telephone number.

URL access component 830 may provide access to a GUI portion of a multimodal application. For example, in a multimodal application, a user may update project information by speech, keyboard input, mouse input, other tactile inputs, etc. URL access component 830 may provide access to the GUI portion of the multimodal application (e.g., URL to access 610 or 710) where the user may update the project information using speech, keyboard input, mouse input, other tactile inputs, etc.

Multimodal architecture component 840 may include the exemplary components shown in FIG. 9 and described below. Multimodal architecture component 840 may retrieve the exemplary components of FIG. 9 from data storage component 800.

Multimodal flow completion component 850 may be executed if testing/QA component 410 has accessed the predetermined multimodal dialog states and performed testing/QA using the conditions provided by the user. If executed, multimodal flow completion component 850 may check that the conditions provided by the user for the multimodal application have been tested.

Notification component 860 may provide notification of the results of the testing/QA of the multimodal application as determined by testing/QA component 410. Notification component 860 may provide such notification in a variety of ways (e.g., via an email, a voicemail, a telephone call, a page, a text message (e.g., instant message (IM) or short message service (SMS)), or a facsimile), etc. The user may specify the level of detail provided in the notification. The notification, for example, may selectively provide a record of every transaction performed on the multimodal application, a record of problems that were encountered during the testing/QA of the multimodal application, and/or an indication of whether or not the testing/QA of the multimodal application was successful.

After notification component 860 provides notification of the results of the testing/QA of the multimodal application, terminate component 870 may end a session (e.g., the telephone call, a web page session, a end session on a PDA, a session on a smart phone, etc.) for the multimodal application, and may end performance of testing/QA of the multimodal application by testing/QA component 410.

Although FIG. 8 shows exemplary components of testing/QA component 410, in other implementations, fewer or more components than depicted in FIG. 8 may be provided for testing/QA component 410. In still other implementations, one or more components of testing/QA component 410 may perform the tasks performed by other components of testing/QA component 410.

FIG. 9 is a functional diagram of multimodal architecture component 840 of testing/QA component 410. As shown, multimodal architecture component 840 may include a variety of exemplary components, e.g., a user-defined multimodal dialog states component 900, a test multimodal elements component 910, an input type for multimodal dialog state component 920, an output type component 930, an external validation component 940, etc.

User-defined multimodal dialog states component 900 may retrieve the multimodal dialog states defined by a user (e.g., first multimodal dialog state 630 and second multimodal dialog state 640) from data storage component 800. User-defined multimodal dialog states component 900 may also keep track of the multimodal dialog states defined by the user and/or default multimodal dialog states (e.g., in situations where a user did not define a multimodal dialog state). For example, user-defined multimodal dialog states component 900 may track a starting multimodal dialog state, an ending multimodal dialog state, a number of multimodal dialog states to be tested, a number of user-defined multimodal dialog states, a number of multimodal default dialog states, etc.

Test multimodal elements component 910 may retrieve multimodal elements (e.g., multimodal events 730 and other multimodal elements 760) from data storage component 800. Test multimodal element component 910 may also keep track of and perform testing/QA on the multimodal elements for each multimodal dialog state provided by user-defined multimodal dialog states component 900. For example, test multimodal elements component 910 may perform testing/QA of global multimodal elements for all multimodal dialog states, of user-defined multimodal elements for each multimodal dialog state, and/or of default multimodal elements for each dialog state. Test multimodal elements component 910 may further order the multimodal elements to be tested by testing/QA component 410.

As described above, the speech input type for a multimodal dialog state may be user-defined or provided (e.g., for default multimodal dialog states) in the form of synthetic speech. The input type for the multimodal dialog state may also be in the form of a keyboard input, a mouse input, and/or other tactile inputs. The input type for multimodal dialog state component 920 may retrieve the inputs for the multimodal dialog states from data storage component 800, and may keep track of the retrieved inputs. The input type for multimodal dialog state component 920 may provide a corresponding input for a multimodal dialog state to the multimodal application if the multimodal application activates the multimodal dialog state. For example, component 920 may provide a corresponding input that is user-defined, a default, or both. In another implementation, component 920 may provide a corresponding input that is user-defined, and may determine if the input is correct, incorrect, or both. For example, if the grammar in a multimodal dialog state is defined for a type of flower (e.g., the grammar is defined as a rose, a tulip, etc.), component 920 may determine whether the user has provided the speech input type for both a rose and a tulip. In another example, component 920 may determine whether the user has provided the location of an incorrect speech input (e.g., sunflower) for the multimodal dialog state. In still another implementation, component 920 may determine whether the user defined a default synthetic speech input type for the multimodal dialog state (e.g., the default input type should be in a male voice or a female voice). In a further implementation, component 920 may determine whether a user has defined speech, keyboard, mouse, and/or other tactile inputs for a multimodal dialog state.

Output type component 930 may generate user-defined or default testing/QA results. For example, output type component 930 may generate testing/QA results in a variety of formats (e.g., Hypertext Markup Language (HTML), text file, etc.). In another example, output type component 930 may generate a variety of testing/QA results, such as, error outputs, missing prompts outputs, exception outputs, a logging level, a default output type, etc.

External validation component 940 may define and interact with external systems and/or services that may validate testing/QA results. For example, if a multimodal application requests that results be validated by a third party via a web-based service, external validation component 940 may provide the necessary details about the web-based service. External validation component 940 may interact with a variety of external systems/services, such as, web-based services (e.g., customized, soap protocol, etc.), database systems (e.g., relational database management systems, object oriented database management systems, etc.), enterprise systems (e.g., Enterprise Java Beans), a Common Object Request Broker Architecture (CORBA), etc.

Although FIG. 9 shows exemplary components of multimodal architecture component 840, in other implementations, fewer or more components than depicted in FIG. 9 may be provided for multimodal architecture component 830.

FIGS. 10 and 11 are flowcharts of exemplary processes for receiving conditions for testing/QA of a multimodal application. FIG. 10 shows an exemplary process 1000 for receiving multimodal flow diagram conditions for performing testing/QA of a multimodal application. As shown in FIG. 10, process 1000 may begin with the receipt of a telephone number to call for testing and/or QA of a multimodal application (block 1010) and/or receipt of a URL to access a GUI portion of the multimodal application (block 1020). For example, in one implementation described above in connection with FIG. 6, phone number input 600 may include the telephone number to call for testing and/or QA of a multimodal application. In other words, the telephone number may provide access to a speech portion of the multimodal application. URL to access 610 may include a URL to access for testing/QA a GUI portion of the multimodal application. A user may provide both the phone number input 600 and/or URL to access 610, and testing/QA component 410 may call the telephone number provided by phone number input 600 and/or invoke URL to access 610 in order to access the multimodal application and perform testing/QA thereon.

Process 1000 may receive a date and/or a time to start testing and/or QA of the multimodal application (block 1030). For example, in one implementation described above in connection with FIG. 6, date/time input 620 may include a date and/or a time indicating when to start testing and/or QA of the multimodal application. A user may provide date/time input 620, and testing/QA component 410 may perform testing/QA of the multimodal application at the date and/or time specified by date/time input 620.

As further shown in FIG. 10, process 1000 may receive a first multimodal dialog state of the multimodal application to be tested (block 1040). For example, in one implementation described above in connection with FIG. 6, first multimodal dialog state 630 may include a first multimodal dialog state of the multimodal application for testing/QA. A user may provide first multimodal dialog state 630 of the multimodal application (e.g., "GetUserID" may be a first multimodal dialog state where the user wants an automatic speech input and/or a keyboard input of user ID number, such as "372938"), and testing/QA component 410 may speech input "372938" and/or keyboard input "372938" if first multimodal dialog state 630 of the multimodal application is accessed.

Process 1000 may receive a second multimodal dialog state of the multimodal application to be tested (block 1050). For example, in one implementation described above in connection with FIG. 6, second multimodal dialog state 640 may include a second multimodal dialog state of the multimodal application for testing/QA. A user may provide second multimodal dialog state 640 of the multimodal application (e.g., "ProjectNames" may be a second multimodal dialog state where the user wants an automatic speech input and/or a keyboard input of "MyProjects") and testing/QA component 410 may speech and/or keyboard input "MyProjects" (e.g., as defined by the user) if second multimodal dialog state 640 of the multimodal application is accessed. Although FIG. 10 shows receipt of two multimodal dialog states (e.g., first and second multimodal dialog states), in other implementations, process 1000 may receive any number of multimodal dialog states.

As further shown in FIG. 10, process 1000 may automatically confirm whether the received information is correct (block 1060). If the received information is not correct (block 1060—NO), process 1000 may return to block 1040 or block 1050 and request receipt of correct information. For example, in one implementation described above in connection with FIG. 6, auto confirm 650 may include a mechanism to automatically confirm whether input information (e.g., provided by testing/QA component 410) is correct. Testing/QA component 410 may automatically input the "MyProjects" for the second multimodal dialog state "ProjectNames," and auto confirm 650 may automatically confirm whether the input is correct. If auto confirm 650 determines that the input is incorrect, testing/QA component 410 may return to second multimodal dialog state 630 and may request re-input of the "MyProjects" for the second multimodal dialog state "ProjectNames."

If the received information is correct (block 1060—YES), process 1000 may receive information of project names assigned to the user and may play the information over the telephone. In another example, the same user may access the project names over a web page (block 1070). The project names displayed on the web page may be synchronized with the names played over the telephone when the user accessed the second multimodal dialog state over the telephone in block 1050. In another implementation, the user may access the multimodal application with a PDA and may later access the same application as a web page with a personal computer. The functions of the multimodal application may be synchronized when the user switches from one device to another. For example, if the user switches from a telephone to a PDA, a web page, a smart phone, etc., the multimodal application may update the project functions on a web page and these updates may be played over the telephone when the user switches from, e.g., a web page to a telephone (block 1080). If the user hangs up the telephone (block 1090), the multimodal application may also synchronously end the session on the web page (block 1095).

FIG. 11 shows an exemplary process 1100 for receiving multimodal dialog states conditions for performing testing/QA of a multimodal application. As shown in FIG. 11, process 1100 for receiving multimodal dialog states conditions may begin with the receipt of a telephone number to call (block 1110) and/or receipt of a URL address (block 1120) for testing and/or QA of a multimodal application. For example, in one implementation described above in connection with FIG. 7, phone number input 700 may include the telephone number to call and URL to access 710 may include a URL to invoke for testing and/or QA of a multimodal application. In other words, the telephone number may provide access to a speech portion of the multimodal application, and the URL may provide access to a GUI portion of the multimodal application. A user may provide phone number input 700 and URL to access 710, and testing/QA component 410 may call the telephone number provided by phone number input 700 and invoke the GUI portion based on URL to access 710 in order to access the multimodal application and perform testing/QA thereon.

Process 1100 may receive a date and/or a time to start testing and/or QA of the multimodal application (block 1130). For example, in one implementation described above in connection with FIG. 7, date/time input 720 may include a date and/or a time indicating when to start testing and/or QA of the multimodal application. For example, a user may provide date/time input 720, and testing/QA component 410 may perform testing/QA of the multimodal application at the date and/or time specified by date/time input 720.

As further shown in FIG. 11, process 1100 may receive either a name of a multimodal dialog state to be tested (block 1140) or may invoke a default multimodal dialog state to be tested (block 1170). For example, in one implementation described above in connection with FIG. 7, the user may have the option of inputting a name of a multimodal dialog state where testing/QA component 410 may begin testing/QA of the multimodal application. In one example, the user may provide the name of multimodal events 730, grammar 740, correct input 750, other multimodal elements 760, etc. Multimodal events 730 may include the names of multimodal events (e.g., noinput, nomatch, help, etc.) for testing/QA by component 410. Grammar 740 may include user-defined grammar to be used for a multimodal dialog state. Correct input 750 may include user-defined correct input for a multimodal dialog state. Other multimodal elements 760 may include any of the multimodal elements used in a multimodal application. If no name for a multimodal dialog state is provided by a user, testing/QA component 410 may start from a default first multimodal dialog state reached by calling the telephone number provided by phone number input 700 and/or be accessing the URL provided URL to access 710.

If the name of a multimodal dialog state is received in block 1140, process 1100 may receive an input location for the received multimodal dialog state name (block 1150). For example, in one implementation described above in connection with FIG. 7, the user may specify, via interface 400, the location of an input (e.g., the names of audio files to be used for a nomatch events, noinput events, etc.) for multimodal events 730. In other implementations, the user may specify, via interface 400, the location of an input (e.g., where a recorded input is stored) for grammar 740, correct input 750, and/or other multimodal elements 760.

Process 1100 may store the name of the received multimodal dialog state to be tested and the input location for the received multimodal dialog state name, if a name and/or input have been received (block 1160). For example in one implementation described above in connection with FIG. 8, data storage component 800 may include any memory device (e.g., main memory 230, read only memory (ROM) 240, and/or storage device 250 of the client/server entity of FIG. 2), and may provide storage for the testing/QA conditions provided by a user via interface 400.

If the default multimodal dialog state is invoked in block 1170, process 1100 may generate an input type for the default multimodal dialog state (block 1180). For example, in one implementation described above in connection with FIG. 7, if the user does not specify the name of a multimodal dialog state (e.g., multimodal events 730) to be tested, testing/QA component 410 may provide synthetic speech, a keyboard input, a mouse input, and/or other tactile inputs for the default multimodal dialog state.

FIG. 12 is a flowchart of an exemplary process 1200 for automatic testing and/or QA of a multimodal application. Process 1200 may begin by calling a telephone number of a multimodal application at a specified date and/or time (block 1210). For example, in one implementation described above in connection with FIG. 8, date/time component 810 may begin performance of testing/QA of a multimodal application at the provided date and time. If testing/QA component 410 begins testing/QA of the multimodal application on the date and/or time as specified by date/time component 810, call number component 820 may retrieve the telephone number to be called for the multimodal application (e.g., phone number input 600 or 700) from data storage component 800. Call number component 820 may also initiate the telephone call to the multimodal application using the retrieved telephone number.

Process 1200 may track multimodal dialog states to be tested for the multimodal application (block 1220). For example, in one implementation described above in connection with FIG. 9, user-defined multimodal dialog states component 900 may retrieve the multimodal dialog states defined by a user (e.g., first multimodal dialog state 630 and second multimodal dialog state 640) from data storage component 800, and may keep track of the multimodal dialog states defined by the user and/or default multimodal dialog states (e.g., in situations where a user did not define a multimodal dialog state).

As further shown in FIG. 12, process 1200 may access the multimodal application by logging into a web page, a PDA, a smart phone, etc. and accessing a URL provided by the user (block 1230). For example, in one implementation described above in connection with FIG. 8, if testing/QA component 410 begins testing/QA of the multimodal application on the date and/or time as specified by date/time component 810, URL access component 830 may retrieve the URL to be invoked for the multimodal application (e.g., URL to access 610 or 710) from data storage component 800.

Process 1200 may perform testing/QA of multimodal elements of a multimodal dialog state (block 1240). For example, in one implementation described above in connection with FIG. 9, test multimodal elements component 910 may retrieve multimodal elements (e.g., multimodal events 730 and other multimodal elements 760) from data storage component 800, and may perform testing/QA on the multimodal elements for each multimodal dialog state provided by user-defined multimodal dialog states component 900.

As further shown in FIG. 12, process 1200 may generate input(s) for performing testing and/or QA of the multimodal application (block 1250). For example, in one implementation described above in connection with FIG. 9, input type for multimodal dialog state component 920 may retrieve the inputs (e.g., speech, keyboard, mouse, and/or other tactile inputs) for the multimodal dialog states from data storage component 800, and may provide a corresponding input for a multimodal dialog state to the multimodal application if the multimodal application activates the multimodal dialog state. Component 920 may provide a corresponding input that is user-defined, a default, or both. In another implementation, component 920 may provide a corresponding input that is user-defined, and may determine if the input is correct, incorrect, or both. In still another implementation, component 920 may determine whether the user defined a default input type for the multimodal dialog state.

Process 1200 may generate results of the testing/QA of the multimodal application (block 1260). For example, in one implementation described above in connection with FIG. 9, output type component 930 may generate user-defined or default testing/QA results. In one example, output type component 930 may output testing/QA results in a variety of formats (e.g., Hypertext Markup Language (HTML), text file, etc.). In another example, output type component 930 may generate a variety of testing/QA results, such as, error outputs, missing prompts outputs, exception outputs, a logging level, a default output type, etc.

As further shown in FIG. 12, process 1200 may (optionally) validate the generated testing/QA results (block 1270). For example, in one implementation described above in connection with FIG. 9, external validation component 940 may define and interact with external systems and/or services that may validate results of the testing/QA. In one example, if a multimodal application requests that results be validated by a third party via a web-based service, external validation component 940 may provide the necessary details about the web-based service.

Process 1200 may provide the generated testing/QA results to a user (block 1280). For example, in one implementation described above in connection with FIG. 8, notification component 860 may provide notification of the results of the testing/QA of the multimodal application as determined by testing/QA component 410. Notification component 860 may provide such notification in a variety of ways (e.g., via an email, a voicemail, a telephone call, a page, a text message (e.g., instant message (IM) or short message service (SMS)), a facsimile, etc.). The user may specify the level of detail provided in the notification. The notification, for example, may selectively provide a record of every transaction performed on the multimodal application, a record of problems that were encountered during the testing/QA of the multimodal application, and/or an indication of whether or not the testing/QA of the multimodal application was successful.

Implementations described herein may provide systems and methods for automatic testing and/or QA of a multimodal application. For example, in one implementation, a telephone number to be called for accessing the multimodal application, and a date and/or time to start testing/QA of the multimodal application may be provided (e.g., by a user) into a system for testing and/or QA of a multimodal application. Conditions for testing/QA of the multimodal application may also be provided to the system. The conditions may be provided by using a multimodal flow diagram, and/or by providing the name of each multimodal dialog state. Multimodal elements to be tested for each dialog state of the multimodal application may be pre-defined and provided to the system. The system may call the provided phone number and may automatically perform testing and/or QA. The system may generate a log of any issues encountered during testing/QA of the multimodal application, and may notify (e.g., the user) of the testing/QA results of the multimodal application.

The foregoing description of preferred embodiments provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 10-12, the order of the acts may be modified in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device, for a multimodal application, multimodal flow diagram conditions that describe dialog states to be reviewed and multimodal dialog state conditions that include a name of each of the dialog states to be reviewed;
   automatically testing, by the computing device, the multimodal application based on the multimodal flow diagram conditions and the multimodal dialog state conditions; and
   generating, by the computing device, test results based on the automatic testing of the multimodal application.

2. The method of claim 1, where the multimodal flow diagram conditions further include at least one of:
   information regarding a telephone number of the multimodal application,
   information regarding a Uniform Resource Locator (URL) of the multimodal application,
   information regarding a date to perform automatic testing of the multimodal application,
   information regarding a time to perform automatic testing of the multimodal application,
   information regarding one of the multimodal dialog states,
   information regarding an auto confirm to confirm whether input information is correct, or
   information regarding a web service invocation for validation of the test result.

3. The method of claim 1, where the multimodal dialog state conditions further include at least one of:
   information regarding a telephone number of the multimodal application,
   information regarding a Uniform Resource Locator (URL) of the multimodal application,
   information regarding a date to perform automatic testing of the multimodal application,
   information regarding a time to perform automatic testing of the multimodal application,
   information regarding a multimodal event,
   information regarding a multimodal element associated with the multimodal event,
   information regarding grammar to be used for the at least one of the multimodal dialog states or for a different one of the dialog states, or
   information regarding a correct input to be used for the one of the multimodal dialog states or for a different one of the dialog states.

4. The method of claim 1, where the multimodal flow diagram conditions and the multimodal dialog state conditions each include at least one of a user-defined condition or a default condition.

5. The method of claim 4, where, when the multimodal flow diagram conditions and the multimodal dialog state conditions include the user-defined condition, the method further comprises:
receiving an input for the user-defined condition; and
automatically testing the multimodal application based on the user-defined condition and the received input.

6. The method of claim 5, where the automatically testing the multimodal application comprises:
accessing the multimodal application;
accessing the multimodal flow diagram conditions and the multimodal dialog state conditions for the multimodal application;
generating inputs, as responses to the multimodal flow diagram conditions and the multimodal dialog state conditions; and
determining whether the multimodal application is functioning correctly based on the responses of the multimodal application to the inputs.

7. The method of claim 1, where the generating the test results comprises:
generating at least one of an error output, a missing prompt output, an exception output, a logging level, or a default output type.

8. The method of claim 1, further comprising:
validating the generated test results.

9. The method of claim 8, where the generated test results are validated by accessing a third party system or service.

10. The method of claim 1, further comprising:
providing notification of the test results to a user.

11. The method of claim 10, where the notification is provided via at least one of an email, a voicemail, a telephone call, a page, a text message, or a facsimile.

12. A system comprising:
one or more processors to:
receive test conditions for a multimodal application, the test conditions including first conditions that describe dialog states to be reviewed and second conditions that include names of the dialog states to be reviewed,
generate inputs to respond to the first conditions and the second conditions,
test the multimodal application based on the first conditions, the second conditions, and the inputs, and
generate test results based on the test of the multimodal application.

13. The system of claim 12, where the one or more processors also:
access the multimodal application;
access the first conditions and the second conditions for the multimodal application;
provide the inputs as responses to the first conditions and the second conditions; and
determine whether the multimodal application is functioning correctly based on the responses to the inputs.

14. The system of claim 12, further comprising:
an interface to receive the first conditions and the second conditions for the multimodal application, and the inputs for responding to the first conditions and the second conditions.

15. The system of claim 14, where the first conditions that include at least one of:
information regarding a telephone number of the multimodal application,
information regarding a Uniform Resource Locator (URL) of the multimodal application,
information regarding a date to perform automatic testing of the multimodal application,
information regarding a time to perform automatic testing of the multimodal application,
information regarding one of the dialog states,
information regarding an auto confirm to confirm whether information for the inputs is correct, or
information regarding an web service invocation for validation of the test results; or
includes second conditions that include at least one of:
information regarding a telephone number of the multimodal application,
information regarding a URL of the multimodal application,
information regarding a date to perform automatic testing of the multimodal application,
information regarding a time to perform automatic testing of the multimodal application,
information regarding a multimodal event,
information regarding a multimodal element associated with the multimodal event,
information regarding grammar to be used for the at least one of the dialog states or for a different one of the dialog states, or
information regarding a correct input to be used for the one of the dialog states or for a different one of the dialog states.

16. The system of claim 14, where the one or more processors further also:
cause a data storage component to store the first conditions, the second conditions, and the inputs;
cause a date/time component to provide a date and time for testing the multimodal application;
cause a call number component to provide a telephone number for accessing the multimodal application;
cause a multimodal architecture component to test the multimodal application, based on the first conditions, the second conditions, and the inputs, to generate the test results;
cause a multimodal flow completion component that determines whether the first conditions or the second conditions have been tested; and
cause a notification component to notify a user of the test results.

17. The system of claim 16, where the one or more processors further also:
cause a user-defined multimodal dialog states component to retrieve a user-defined multimodal dialog state and track the user-defined multimodal dialog state and a default multimodal dialog state;
cause a test multimodal elements component to retrieve a multimodal element corresponding to the user-defined multimodal dialog state and test the multimodal element;
cause an input type for multimodal dialog state component to retrieve inputs corresponding to the user-defined multimodal dialog state and provide the inputs to the multimodal application when the multimodal application activates the user-defined multimodal dialog state;
cause an output type component to generate the test results based on the user-defined multimodal dialog state and the inputs; and
cause an external validation component to validate the test results.

18. The system of claim 14, where the second conditions comprise a default test condition and the inputs further include synthetic speech responsive to the default test condition.

19. A non-transitory computer-readable medium comprising:
one or more instructions, which when executed by one or more processors, cause the one or more processors to:
receive, for a multimodal application, first conditions that describe dialog states to be reviewed, and second conditions that include names of the dialog states to be reviewed;
automatically test the multimodal application based on the first conditions and the second conditions; and
generate test results based on the automatic testing of the multimodal application.

20. The computer-readable medium of claim 19, further comprising one or more additional instructions to:
access the multimodal application;
retrieve the first conditions and the second conditions for the multimodal application;
provide inputs as responses to the first conditions and the second conditions; and
determine whether the multimodal application is functioning correctly based on multimodal application responses to the inputs.

* * * * *